United States Patent
Yoda et al.

(10) Patent No.: US 11,637,290 B2
(45) Date of Patent: Apr. 25, 2023

(54) SLURRY INCLUDING CARBON BLACK, ELECTRODE PASTE, METHOD FOR PRODUCING ELECTRODE, AND METHOD FOR PRODUCING SECONDARY BATTERY

(71) Applicant: DENKA COMPANY LIMITED, Tokyo (JP)

(72) Inventors: Akira Yoda, Tokyo (JP); Tatsuya Nagai, Tokyo (JP); Tetsuya Ito, Tokyo (JP)

(73) Assignee: DENKA COMPANY LIMITED, Tokyo (JP)

(*) Notice: Subject to any disclaimer, the term of this patent is extended or adjusted under 35 U.S.C. 154(b) by 51 days.

(21) Appl. No.: 17/605,814

(22) PCT Filed: Apr. 17, 2020

(86) PCT No.: PCT/JP2020/016942
§ 371 (c)(1),
(2) Date: Oct. 22, 2021

(87) PCT Pub. No.: WO2020/218211
PCT Pub. Date: Oct. 29, 2020

(65) Prior Publication Data
US 2022/0200006 A1   Jun. 23, 2022

(30) Foreign Application Priority Data
Apr. 26, 2019 (JP) .............................. JP2019-085855

(51) Int. Cl.
| | | |
|---|---|---|
| C09C 1/48 | (2006.01) | |
| H01M 4/62 | (2006.01) | |
| C09C 1/56 | (2006.01) | |
| H01M 4/04 | (2006.01) | |
| H01M 4/1391 | (2010.01) | |
| H01M 4/505 | (2010.01) | |
| H01M 4/525 | (2010.01) | |
| H01M 10/0525 | (2010.01) | |

(52) U.S. Cl.
CPC ............... *H01M 4/625* (2013.01); *C09C 1/56* (2013.01); *H01M 4/0404* (2013.01); *H01M 4/1391* (2013.01); *H01M 4/505* (2013.01); *H01M 4/525* (2013.01); *H01M 4/623* (2013.01); *H01M 10/0525* (2013.01); *C01P 2004/62* (2013.01); *C01P 2006/22* (2013.01); *C01P 2006/40* (2013.01)

(58) Field of Classification Search
CPC .............. C01P 2004/22; C01P 2004/62; C01P 2004/40
See application file for complete search history.

(56) References Cited

U.S. PATENT DOCUMENTS

| | | | |
|---|---|---|---|
| 5,514,488 A | 5/1996 | Hake et al. | |
| 5,542,969 A | 8/1996 | Hirasa et al. | |
| 6,428,929 B1 | 8/2002 | Koy et al. | |
| 2013/0089780 A1 | 4/2013 | Uezono | |
| 2018/0233734 A1 | 8/2018 | Ahn et al. | |

FOREIGN PATENT DOCUMENTS

| | | | |
|---|---|---|---|
| EP | 0657953 A1 | 6/1995 | |
| EP | 1058327 A2 | 12/2000 | |
| EP | 2025723 A1 | 2/2009 | |
| JP | H08151546 A | 6/1996 | |
| JP | 2003157846 A | 5/2003 | |
| JP | 2004281096 A | 10/2004 | |
| JP | 2008227481 A | 9/2008 | |
| JP | 2009205950 A | 9/2009 | |
| JP | 2011070908 A | 4/2011 | |
| JP | 2013/089575 | * | 5/2013 |
| JP | 2013084397 A | 5/2013 | |
| JP | 2013084525 A | 5/2013 | |
| JP | 2013089575 A | 5/2013 | |
| JP | 2013109852 A | 6/2013 | |
| JP | 2014194901 A | 10/2014 | |
| JP | 2015176688 A | 10/2015 | |
| JP | 2017143027 A | 8/2017 | |
| JP | 2018062545 A | 4/2018 | |
| JP | 2018530113 A | 10/2018 | |
| JP | 2018190501 A | 11/2018 | |
| JP | 2018206579 A | 12/2018 | |
| KR | 1020160063894 A | 6/2016 | |
| WO | 2014132809 A1 | 9/2014 | |

OTHER PUBLICATIONS

International Search Report from corresponding PCT/JP2020/016942 dated Jul. 7, 2020.
Extended European Search Report from corresponding EP 20796270.5 dated May 3, 2022.
Translation of International Preliminary Report on Patentability for PCT/JP2020/016942.

* cited by examiner

*Primary Examiner* — Austin Murata
(74) *Attorney, Agent, or Firm* — Caesar Rivise, PC

(57) ABSTRACT

A slurry including at least a carbon black and a dispersion medium, wherein a concentration of the carbon black in the slurry is 5% by mass or more and 25% by mass or less, and wherein in a volume-based frequency distribution of particle size of the carbon black measured by a laser diffraction/scattering method, provided that a volume concentration of carbon black with a particle size of 0.6 μm or more is x (%), a volume concentration of carbon black with a particle size of 0.3 μm or more and less than 0.6 μm is y (%), and a volume concentration of carbon black having a particle size of less than 0.3 μm is 100−(x+y) (%), the slurry satisfies 10≤x≤70, 30≤y≤90, and 0≤100−(x+y)≤30.

13 Claims, 1 Drawing Sheet

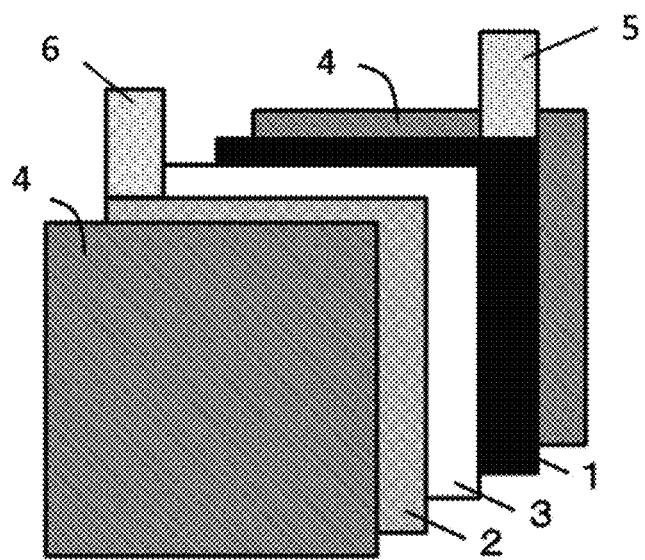

SLURRY INCLUDING CARBON BLACK, ELECTRODE PASTE, METHOD FOR PRODUCING ELECTRODE, AND METHOD FOR PRODUCING SECONDARY BATTERY

CROSS-REFERENCE TO RELATED APPLICATIONS

This application is a U.S. National Phase Application of PCT/JP2020/016942, filed Apr. 17, 2020, which claims priority to JP 2019-085855, filed Apr. 26, 2019, the contents of which applications are incorporated herein by reference in their entireties for all purposes.

FIELD OF THE INVENTION

The present invention relates to a slurry including carbon black. The present invention also relates to an electrode paste, a method for producing an electrode, and a method for producing a secondary battery.

BACKGROUND OF THE INVENTION

In recent years, electronic devices have become smaller and more portable, and along with this, it becomes necessary to reduce the size and weight of the batteries which those devices are equipped with. As a specific performance, it is required to increase the energy density per volume and mass of the battery as much as possible. Among the secondary batteries generally used in portable devices, the secondary battery having a large energy density per mass and volume is a lithium-ion secondary battery, and it is widely used as a power source for small consumer devices such as smart mobile phones and tablet personal computers. In addition, the use of lithium-ion secondary batteries is increasing as batteries for electric vehicles and hybrid vehicles, and also as household storage batteries, and it is expected that the demand for medium-sized and large-sized lithium-ion secondary batteries will increase.

Conventionally, a positive electrode of a lithium-ion secondary battery is produced by applying an electrode paste including a positive electrode active material, a conductive material, and a binder to a current collector. As the positive electrode active material, composite oxides containing lithium such as lithium cobalt oxide and lithium manganate have been used. Since the active material itself has poor conductivity, it has been implemented to add conductive materials such as a carbon black with a developed structure (structure in which a plurality of primary particles is fused: primary aggregate) or a conductive material such as graphite in which anisotropic crystals are developed (Patent Literature 1).

The basic role of the conductive material is to impart conductivity to the non-conductive active material and prevent the electrode active material from impairing the conductivity due to repeated expanding and contracting during charging and discharging. Therefore, when producing an electrode, it is important that the size of the structure of carbon black used as a conductive material should be controlled within a certain range. If the control is not sufficient or the dispersion among the active materials is poor, there arises problems that sufficient contact between the active material and the carbon black cannot be obtained, conductive paths cannot be secured, and the performance of the composite oxide containing lithium, which is an active material, cannot be sufficiently brought out. As a result, a portion having poor conductivity appears locally in the electrode, which causes the active material to be less effectively used, the discharge capacity to decrease, and the battery life to be shortened.

Accordingly, in Patent Literature 2, in order to improve the dispersibility of the carbon black in the slurry, a method of dispersing carbon black in a solvent in the submicron order by a high-pressure jet mill in the presence of polyvinylpyrrolidone as a dispersant is carried out. According to Patent Literature 2, it is described that a lithium-ion secondary battery having a high capacity and excellent cycle characteristics can be obtained by using carbon black having a stable dispersed state as the positive electrode.

Patent Literature 3 discloses a conductive material that exhibits dispersion stability and excellent conductivity with a small amount of addition in a positive electrode for a lithium-ion secondary battery. Specifically, a carbon black slurry, characterized in that N-methyl-2-pyrrolidone is used as a dispersion medium, and carbon black having an average particle size of 0.1 to 1 μm is suspended in a proportion of 3 to 30% by mass, and 0.1 to 10% by mass of a vinylpyrrolidone-based polymer is added, is proposed. An Example of Patent Literature 3 describes carbon black having an average particle size of 0.3 μm determined by laser diffraction/scattering spectroscopy, and it is shown that the lithium-ion secondary battery produced by using the carbon black as the conductive material of the positive electrode had a high discharge capacity.

Patent Literature 4 proposes a conductive material dispersion liquid including carbon black having an average primary particle diameter of 40 nm or less and an average dispersed particle diameter of 400 nm or less, or carbon nanotubes having an average outer diameter of 30 nm or less and dispersed without aggregation, and the dispersant including nonionic dispersant, for the purpose of ensuring good dispersibility and conductivity. Patent Literature 4 studies the conductivity by applying an electrode paste prepared using this conductive material dispersion liquid onto an aluminum foil and then measuring the electrical resistance.

Patent Literature 5 discloses that by using a carbon black dispersion including carbon black, polyvinyl alcohol as a dispersant, and N-methyl-2-pyrrolidone as a solvent, and by controlling the specific surface area of the carbon black and the added amount of polyvinyl alcohol having a saponification degree of 60 to 85 mol % within a predetermined range, the surface resistance of the battery electrode mixture layer and the capacity retention rate after 50 cycles become good.

Patent Literature 6 specifies the dispersed state of the positive electrode conductive material paste using granular acetylene black by the particle size and the volume frequency, and demonstrates that the DC resistance value and output characteristics of the battery can be improved.

In Patent Literature 7, there is provided a carbon black for lithium-ion secondary batteries with an average primary particle size of 20 nm or less and a volatile content of 0.20% or less, for the purpose of providing carbon black that can significantly improve the large current discharge characteristics for lithium-ion secondary batteries even when added in a small amount.

Patent Literature 8 proposes a powdery carbon black composition having excellent conductivity-imparting ability and dispersibility. Specifically, there is described a powder carbon black composition comprising 90 to 99% by mass of carbon black powder having a primary particle size of 20 to 30 nm and 10 to 1% by mass of a polyamine polymer, having a BET specific surface area of 110 to 150 m²/g, and a DBP absorption amount of 190 to 230 ml/100 g.

CITATION LIST

Patent Literature

[Patent Literature 1] Japanese Patent Application Publication No. 2008-227481
[Patent Literature 2] Japanese Patent Application Publication No. 2004-281096
[Patent Literature 3] Japanese Patent Application Publication No. 2003-157846
[Patent Literature 4] Japanese Patent Application Publication No. 2011-70908
[Patent Literature 5] WO 2014/132809
[Patent Literature 6] Japanese Patent Application Publication No. 2013-109852
[Patent Literature 7] Japanese Patent Application Publication No. 2014-194901
[Patent Literature 8] Japanese Patent Application Publication No. 2018-62545

SUMMARY OF THE INVENTION

As described above, it has been conventionally proposed to improve the battery characteristics by improving the dispersibility of carbon black, and controlling the particle size of carbon black, which is a conductive material in the electrode. However, until now, sufficient research has not been conducted on the relationship between the characteristics of carbon black and the internal resistance of a secondary battery. The internal resistance does not always decrease even if the conductivity of the electrode is increased, and there still remains unexplained things. Since the problem of the internal resistance of the secondary battery becomes more important as the size of the battery increases and the amount of current increases, it would be advantageous if embodiments of carbon black effective for reducing the internal resistance of the secondary battery could be unveiled.

The present invention has been invented in view of the above circumstances, and in one embodiment, it is an object of the present invention to provide a slurry including carbon black and capable of contributing to reduction of internal resistance of a secondary battery.

Further, in another embodiment, an object of the present invention is to provide an electrode paste including such a slurry. Further, in another embodiment, an object of the present invention is to provide a method for producing an electrode using such an electrode paste. Furthermore, an object of the present invention is to provide a method for producing a secondary battery, which comprises carrying out the method for producing such an electrode.

The present inventors have made a diligent study to solve the above problem and have found that in order to significantly reduce the internal resistance of a battery, it is not enough to miniaturize carbon black to the submicron order, and it is effective to produce an electrode paste using a slurry in which the volume concentrations of carbon black having a particle size of 0.6 μm or more, carbon black having a particle size of 0.3 μm or more and less than 0.6 μm, and carbon black having a particle size of less than 0.3 μm are appropriately controlled. The present invention has been completed based on the above findings, and is exemplified as below.

[1]
A slurry comprising at least a carbon black and a dispersion medium, wherein a concentration of the carbon black in the slurry is 5% by mass or more and 25% by mass or less, and
wherein in a volume-based frequency distribution of particle size of the carbon black measured by a laser diffraction/scattering method, provided that a volume concentration of carbon black with a particle size of 0.6 μm or more is x (%), a volume concentration of carbon black with a particle size of 0.3 μm or more and less than 0.6 μm is y (%), and a volume concentration of carbon black having a particle size of less than 0.3 μm is 100−(x+y) (%), the slurry satisfies $10 \leq x \leq 70$, $30 \leq y \leq 90$, and $0 \leq 100-(x+y) \leq 30$.

[2]
The slurry according to [1], wherein a cumulative 50% particle size (D50) in the volume-based cumulative distribution of particle size of the carbon black measured by the laser diffraction/scattering method is 0.40 to 0.85 μm.

[3]
The slurry according to [1] or [2], wherein a cumulative 90% particle size (D90) in the volume-based cumulative distribution of particle size of the carbon black measured by the laser diffraction/scattering method is 1.0 to 30.0 μm.

[4]
The slurry according to any one of [1] to [3], comprising N-methyl-2-pyrrolidone as a dispersion medium.

[5]
The slurry according to any one of [1] to [4], comprising a dispersant.

[6]
The slurry according to [5], wherein a content of the dispersant in the slurry is 5 parts by mass or more and 20 parts by mass or less with respect to 100 parts by mass of the carbon black.

[7]
The slurry according to [5] or [6], comprising a nonionic dispersant as the dispersant.

[8]
The slurry according to any one of [5] to [7], comprising polyvinyl alcohol as the dispersant.

[9]
The slurry according to [8], wherein a degree of saponification of the polyvinyl alcohol is 86 to 97 mol %.

[10]
The slurry according to any one of [1] to [9], satisfying $30 \leq x \leq 60$, $30 \leq y \leq 60$, and $10 \leq 100-(x+y) \leq 30$.

[11]
An electrode paste, comprising the slurry according to any one of [1] to [10], an electrode active material, and a binder.

[12]
A method for producing an electrode, comprising applying the electrode paste according to [11] to a current collector.

[13]
A method for producing a secondary battery comprising a positive electrode, a negative electrode, and an electrolyte, the method comprising producing one or both of the positive electrode and the negative electrode by carrying out the method for producing an electrode according to [12].

By preparing an electrode paste using the slurry comprising the carbon black according to one embodiment of the present invention and using an electrode prepared with the electrode paste, a secondary battery having a significantly reduced internal resistance and an excellent capacity retention rate can be obtained.

BRIEF DESCRIPTION OF THE DRAWINGS

FIG. 1 is a diagram showing an example of a basic configuration of a lithium-ion secondary battery.

DETAILED DESCRIPTION OF THE INVENTION (1. Slurry Including Carbon Black)

According to one embodiment of the present invention, a slurry including at least a carbon black and a dispersion medium is provided. Carbon black maintains the conductivity of the entire electrode and also serves as a cushioning material for expansion and contraction of the active materials. Examples of carbon black include thermal black, furnace black, lamp black, channel black, and acetylene black. Among these, acetylene black is preferable because of its high purity.

The carbon black concentration in the slurry is preferably 5% by mass or more and 25% by mass or less. If the lower limit of the carbon black concentration in the slurry is less than 5% by mass, the concentration is too low and the proportion of transportation cost and dispersion medium cost get high, resulting in a relatively high price. The lower limit of the carbon black concentration in the slurry is more preferably 6% by mass or more, and even more preferably 7% by mass or more. On the other hand, if the upper limit of the carbon black concentration in the slurry exceeds 25% by mass, the viscosity gets too high and dispersion becomes difficult, and it becomes difficult to obtain the desired conductivity-imparting effect. The upper limit of the carbon black concentration in the slurry is more preferably 23% by mass or less, even more preferably 20% by mass or less, even more preferably 14% by mass or less, and even more preferably 11% by mass or less.

In a volume-based frequency distribution of particle size of the carbon black measured by a laser diffraction/scattering method, provided that a volume concentration of carbon black with a particle size of 0.6 μm or more is x (%), a volume concentration of carbon black with a particle size of 0.3 μm or more and less than 0.6 μm is y (%), and a volume concentration of carbon black having a particle size of less than 0.3 μm is $100-(x+y)$ (%), it is preferable that the carbon black in the slurry satisfy $10 \leq x \leq 70$, $30 \leq y \leq 90$, and $0 \leq 100-(x+y) \leq 30$. By using carbon black having such a particle size distribution as a conductive material, the internal resistance of the battery can be significantly reduced. It is more preferable that $10 \leq x \leq 60$, $30 \leq y \leq 80$, and $5 \leq 100-(x+y) \leq 30$ be satisfied, and even more preferable that $30 \leq x \leq 60$, $30 \leq y \leq 60$, and $10 \leq 100-(x+y) \leq 30$ be satisfied.

As the carbon black in the slurry, it is preferable that a cumulative 50% particle size (D50) in the volume-based cumulative distribution of particle size of the carbon black measured by the laser diffraction/scattering method be 0.40 to 0.85 μm. By controlling the D50 in combination with the volume-based frequency distribution of particle size of the carbon black described above, the internal resistance of the battery can be further reduced. The D50 is more preferably 0.45 to 0.80 μm, and even more preferably 0.45 to 0.75 μm.

As the carbon black in the slurry, it is preferable that a cumulative 90% particle size (D90) in the volume-based cumulative distribution of particle size of the carbon black measured by the laser diffraction/scattering method be 1.0 to 30.0 μm. By controlling the D90 in combination with the volume-based frequency distribution of particle size of the carbon black described above, the internal resistance of the battery can be further reduced. The D90 is more preferably 1.0 to 27.5 μm, and even more preferably 1.0 to 25.0 μm.

In the present specification, the volume-based distribution of particle size of the carbon black measured by the laser diffraction/scattering method can be measured by the following method using a particle size distribution measuring device (example: "Microtrac MT3300EXII", "Ultra-Small Volume Recirculator (USVR)" produced by MicrotracBEL). Measurement conditions: Measuring range=0.02 to 2000 μm; particle permeability=absorption; particle shape=non-spherical; solvent=N-methylpyrrolidone; recirculating output=5

Sample charging amount: Add and adjust the slurry so that it is within the optimum concentration range displayed at the time of sample charge.

In addition, the particle size distribution of carbon black measured here is not the particle size distribution of the primary particle size of carbon black, but the particle size distribution of the structure formed by the aggregation of the primary particles of carbon black.

Examples of the dispersion medium include, but not limited to, aliphatic hydrocarbon solvents such as pentane, normal hexane, octane, cyclopentane and cyclohexane; aromatic hydrocarbon solvents such as benzene, toluene, xylene and cymene; aldehyde solvents such as furfural; ketone solvents such as acetone, methyl ethyl ketone, cyclopentanone and cyclohexanone; ester solvents such as butyl acetate, ethyl acetate, methyl acetate, butyl propionate, ethylene glycol monoethyl ether acetate, propylene glycol monomethyl ether acetate, 3-methoxybutyl acetate and ethylene glycol diacetate; ether solvents such as tetrahydrofuran, dioxane and ethylene glycol dimethyl ether; alcohol solvents such as methanol, ethanol, normal propyl alcohol, isopropyl alcohol, butyl alcohol, octyl alcohol, cyclohexanol, allyl alcohol, benzyl alcohol, cresol and furfuryl alcohol; polyol solvents such as glycerol, ethylene glycol and diethylene glycol; alcohol ether solvents such as ethylene glycol monomethyl ether, ethylene glycol monoethyl ether, ethylene glycol monobutyl ether, propylene glycol monomethyl ether and diethylene glycol monobutyl ether; aprotic polar solvents such as N-methyl-2-pyrrolidone, dimethyl sulfoxide and dimethylformamide; and water. As the solvent, one type may be used alone, or two or more types may be used in combination. Among these, N-methyl-2-pyrrolidone is preferable in terms of solubility when polyvinylidene fluoride is used as the binder.

The slurry preferably contains a dispersant in order to enhance the dispersion stability of the carbon black. As the dispersant, those that do not affect the battery characteristics and do not decompose when a voltage is applied in the battery are preferable. As the dispersant, for example, a non-ionic dispersant having no ionic functional group can be used. However, the non-ionic dispersant may contain a small amount of ionic functional groups. Specific examples of the dispersant include polyvinylidene fluoride, polytetrafluoroethylene, polyhexafluoropropylene, polyethylene, polypropylene, polymethyl methacrylate, polyvinyl chloride, polyvinylidene chloride, polyvinyl acetate, polyacrylic acid, polyvinyl butyral, polyacrylamide, polyurethane, polydimethylsiloxane, epoxy resin, acrylic resin, polyester resin, melamine resin, phenol resin, various rubbers, lignin, pectin, gelatin, xanthan gum, welan gum, succinoglycan, polyvinyl alcohol, polyvinyl acetal, cellulose resin, polyalkylene oxide, polyvinyl ether, polyvinylpyrrolidone, chitins, chitosans, starches and polyamines, and the like. As the dispersant, one type may be used alone, or two or more types may be used in combination.

As the dispersant, polyvinyl alcohol, which also has an effect as a binder, is preferable. The polyvinyl alcohol may be either a fully saponified type or a partially saponified type, but a polyvinyl alcohol having a degree of saponification of 86 to 97 mol % is more preferable, and polyvinyl alcohol having a degree of saponification of 86 to 90 mol % is even more preferable because there are extremely few side reactions when a high voltage is applied to the positive electrode. The degree of saponification is measured in accordance with JIS K6726: 1994. That is, it can be obtained by quantifying the residual acetic acid group (mol %) in the sample with sodium hydroxide and subtracting it from 100.

The content of the dispersant in the slurry is preferably 5 parts by mass or more and 20 parts by mass or less with respect to 100 parts by mass of the carbon black. When the lower limit of the content of the dispersant in the slurry is less than 5 parts by mass with respect to 100 parts by mass of the carbon black, the dispersibility is poor when dispersed, and when mixed with active materials, dispersion tends to be poor due to reaggregation. The lower limit of the content of the dispersant in the slurry is more preferably 6 parts by mass or more, and even more preferably 7 parts by mass or more with respect to 100 parts by mass of the carbon black. Further, if the upper limit of the content of the dispersant in the slurry exceeds 20 parts by mass with respect to 100 parts by mass of the carbon black, there is a concern that the battery characteristics may be deteriorated, and cutting of the carbon black structure may be further promoted during the dispersion process. The upper limit of the content of the dispersant in the slurry is more preferably 15 parts by mass or less, and even more preferably 10 parts by mass or less with respect to 100 parts by mass of the carbon black.

(2. Production of Slurry Including Carbon Black)

An example of method for producing the above-mentioned slurry including carbon black will be described. First, a raw material gas such as hydrocarbon is supplied from a nozzle installed at the top of a reactor, carbon black powder is produced by a thermal decomposition reaction and/or a partial combustion reaction, and collected by a bag filter directly connected to the lower portion of the reactor. The raw material gas used is not particularly limited, and gaseous hydrocarbons such as acetylene, methane, ethane, propane, ethylene, propylene and butadiene, and gasified oily hydrocarbons such as toluene, benzene, xylene, gasoline, kerosene, light oil and heavy oil can be used. As the raw material gas, one type may be used alone, or two or more types may be used in combination. As the raw material gas, it is preferable to use acetylene gas which has a small amount of impurities such as sulfur.

The appropriate average particle size of the primary particles of the carbon black powder is 15 to 30 nm. If the average particle size is smaller than 15 nm, the dispersion processing, which will be described later, cannot be performed, and if it is larger than 30 nm, it is difficult to obtain an appropriate structure size, and the target conductivity-imparting ability cannot be obtained. The average particle size of the primary particles herein means the average particle size measured based on a photograph taken with a transmission electron microscope or the like. Further, the particle size is a circle-equivalent diameter calculated from the area of the primary particles. Specific examples of the carbon black powder include those available in the market, and mention can be made to acetylene black Li-435 and FX-35 produced by Denka Co., Ltd. and processed products thereof.

Next, a predetermined amount of carbon black powder and a dispersant are charged into a dispersion medium, and a dispersion processing is carried out to manufacture a slurry including carbon black. As long as the particle size distribution of the carbon black can be controlled, a dispersion processor used for ordinary dispersion processing or the like can be used. For example, mention can be made to mixers such as dispersers, homomixers, Henschel mixers and planetary mixers; dispersion processing equipment using mediums such as bead mills; and medium-free dispersion processing equipment such as ultrasonic homogenizers and wet atomizers. The dispersion processor is not limited to these. Further, one type of the dispersion processor may be used, but a plurality of types of processors may be used in combination as appropriate.

Regardless of which dispersion processor is used, it is important to set the dispersion processing conditions such that the volume concentration (%) of carbon black with a particle size of 0.6 μm or more, the volume concentration (%) of carbon black with a particle size of 0.3 μm or more and less than 0.6 μm, and the volume concentration (%) of carbon black with a particle size of less than 0.3 μm are within the predetermined range. In the dispersion processing, the larger the energy and the longer the time are, the larger the volume concentration (%) of carbon black having a particle size of less than 0.3 μm becomes, due to progress of the elimination of secondary aggregation of the carbon black powder and the cutting of the structure.

Further, in the dispersion processing, the smaller the energy and the shorter the time are, the larger the volume concentration (%) of carbon black having a particle size of 0.6 μm or more becomes because the elimination of secondary aggregation of the carbon black powder and the cutting of the structure do not progress, (3. Production of Electrode Paste)

An electrode paste can be produced by adding an electrode active material and a binder to the slurry including the carbon black according to the present invention. For example, 95 to 99 parts by mass of the electrode active material can be added, and 97 to 99 parts by mass can be preferably added to 1 part by mass of the carbon black in the slurry. The binder can be added in an amount of 1 to 2 parts by mass, preferably 0.5 to 1 part by mass to 1 part by mass of the carbon black in the slurry. Electrode active material includes positive electrode active materials and negative electrode active materials. The slurry according to the present invention can be used for producing either a positive electrode paste or a negative electrode paste.

The positive electrode active materials that can be used include, but not limited to, a lithium composite oxide mainly composed of $Li_xMO_2$ (where M is one or more types of transition metals and $0.05 \leq x \leq 1.0$), and lithium-free metal sulfides and metal oxides such as $TiS_2$, $FeS$, $MoS_2$, $NbSe_2$, and $V_2O_5$. Among them, lithium-containing transition metal oxides containing cobalt and/or manganese such as $LiCoO_2$, $LiNi_{1/3}Mn_{1/3}CO_{1/3}O_2$, and $LiMn_2O_4$ are preferable in that they can increase the electromotive force of the battery. Other positive electrode active materials that can be used include $LiNi_xCo_yAl_zO_2$ in which a part of cobalt is replaced with nickel or aluminum, $LiNi_xMn_yCo_zO_2$ (x>y, z) in which a part of cobalt and manganese is replaced with nickel to increase the nickel content, and $LiNi_xMn_2O_4$ in which a part of manganese is replaced with nickel, or the like. Furthermore, conductive polymers such as polyaniline, polyacetylene, polypyrrole, and polythiophene can also be used. As the positive electrode active material, one type may be used alone, or two or more types may be used in combination.

The negative electrode active materials that can be used include, but not limited to various carbonaceous materials such as natural graphite, artificial graphite, graphite, activated carbon, coke, needle coke, fluid coke, mesophase microbeads, carbon fibers, and pyrolytic carbon. Further, as the negative electrode active material, mention can be made to metallic lithium or its alloys (LiSn alloys, LiSi alloys, LiBi alloys, LiPb alloys, and the like), lithium composite oxides (lithium titanate, lithium vanadate, lithium silicate, lithium-containing iron oxides, and the like), conductive polymers (polyacetylene, poly-p-phenylene, and the like). As the negative electrode active material, one type may be used alone, or two or more types may be used in combination.

Examples of the binder include, but not limited to, those that are normally used, such as polyethylene, nitrile rubber, polybutadiene, butyl rubber, polystyrene, styrene-butadiene rubber, polysulfide rubber, nitrocellulose, cetylmethylcellulose, polyvinyl alcohol, ethylene tetrafluoride resin, polyvinylidene fluoride, polychloroprene fluoride, and the like. As the binder, one type may be used alone, or two or more types may be used in combination.

The electrode active material preferably has an average particle size in the range of 0.05 to 100 μm, and more preferably in the range of 0.1 to 50 μm. In the present specification, the average particle size of the electrode active material is an average value of the particle size of the electrode active material as measured with an electron microscope. Further, the particle size is a circle-equivalent diameter calculated from the area of a primary particle.

(4. Manufacture of Electrodes)

The electrode can be produced as a laminate in which an electrode mixture layer is laminated on a current collector by applying an electrode paste to a current collector such as a metal foil and then evaporating the solvent for drying. As the electrode, either a positive electrode or a negative electrode can be produced. Examples of the material of the current collector used for the electrode include, but not limited to, metals such as gold, silver, copper, platinum, aluminum, iron, nickel, chromium, manganese, lead, tungsten, and titanium, and alloys containing any one of these as a main component (stainless steel, and the like). Among these, it is preferable to use aluminum for the positive electrode and copper for the negative electrode. The current collector is generally provided in the form of a foil, but the current collector is not limited to that, and a perforated foil-shaped or mesh-shaped current collector can also be used.

Examples of the method of applying the electrode paste to a current collector include, but not limited to, die coating method, dip coating method, roll coating method, doctor coating method, knife coating method, spray coating method, gravure coating method, screen printing method, electrostatic coating method, and the like. As the drying method, left-to-dry, a blowing dryer, a warm gas-blowing dryer, an infrared heater, a far infrared heater and the like can be used, but the drying method is not particularly limited thereto.

Further, after the coating, a flatting process such as a flat-plate press or a calendar roll may be performed. The target electrode can be obtained by pressurizing the current collector and the electrode mixture layer with a roll press or the like to bring them into close contact with each other.

(5. Manufacture of Battery)

According to one embodiment of the present invention, a secondary battery can be produced using one or both of the positive electrode and the negative electrode obtained in the above procedure. Examples of the secondary battery include, but not limited to, lithium-ion secondary batteries, as well as sodium-ion secondary batteries, magnesium secondary batteries, alkaline secondary batteries, lead storage batteries, sodium sulfur secondary batteries, lithium air secondary batteries, and the like. Conventionally known electrolytes, separators, and the like can be appropriately used in each secondary battery.

For example, in the case of a lithium-ion secondary battery, an electrolyte containing lithium can be used by dissolving it in a non-aqueous solvent. As specific examples, mention can be made to $LiBF_4$, $LiClO_4$, $LiPF_6$, $LiAsF_6$, $LiSbF_6$, $LiCF_3SO_3$, $Li(CF_3SO_2)_2N$, $LiC_4F_9SO_3$, $Li(CF_3SO_2)_3C$, LiI, LiBr, LiCl, LiAlCl, $LiHF_2$, LiSCN, or $LiBPh_4$, or the like. As the electrolyte, one type may be used alone, or two or more types may be used in combination.

Examples of the non-aqueous solvent include, but not limited to, carbonates such as ethylene carbonate, propylene carbonate, butylene carbonate, dimethyl carbonate, ethylmethyl carbonate and diethyl carbonate; lactones such as γ-butyrolactone, γ-valerolactone and γ-octanoic lactone; glymes such as tetrahydrofuran, 2-methyltetrahydrofuran, 1,3-dioxolane, 4-methyl-1,3-dioxolane, 1,2-methoxyethane, 1,2-ethoxyethane and 1,2-dibutoxyethane; esters such as methylformate, methylacetate and methylpropionate; sulfoxides such as dimethyl sulfoxide and sulfolane; and nitriles such as acetonitrile, and the like. As the solvent, one type may be used alone, or two or more types may be used in combination.

Further, as the electrolyte, an organic solid electrolyte and/or an inorganic solid electrolyte can also be used. Examples of the organic solid electrolyte include, but not limited to, polyelectrolyte such as polyethylene oxide (PEO) and organic electrolyte salts such as lithium bis (trifluoromethanesulfonyl) imide (LiTFSI). Examples of the inorganic solid electrolyte include, but not limited to, sulfide type inorganic solid electrolytes (example: LPS type, LGPS type) and oxide type inorganic solid electrolytes (example: LLZ type).

As the separator sandwiched between the positive electrode and the negative electrode as needed, any material having sufficient strength, such as an electrically insulating porous film, a net, and a non-woven fabric, can be used. In particular, it is preferable to use a separator having low resistance to ion transfer of the electrolytic solution and excellent in solution retention. The material is not particularly limited, but mention can be made to inorganic fibers such as glass fibers or organic fibers, synthetic resins such as polyethylene, polypropylene, polyester, polytetrafluoroethylene, polyflon, and the like, and layered composites thereof, and the like. From the viewpoint of adhesiveness and safety, polyethylene, polypropylene or a layered composite film thereof is desirable. Examples include, but not limited to, polyethylene non-woven fabrics, polypropylene non-woven fabrics, polyamide non-woven fabrics, and those obtained by subjecting them to a hydrophilic treatment.

The structure of the secondary battery can be various shapes depending on the purpose of use, such as a paper type, a cylindrical type, a button type, and a laminated type.

The application of the lithium-ion secondary battery according to the present invention is not particularly limited. For example, it can be used as a power source for small consumer devices such as smart mobile phones, tablet personal computers, household electric appliances, and electric tools. Further, it can also be used as a power source for power of electric vehicles and hybrid vehicles, industrial equipment such as an elevator having a system for recovering at least a part of kinetic energy, and various large power sources such as a power source for various commercial and household power storage systems.

EXAMPLES

Examples of the present invention are shown below together with Comparative Examples, but the Examples are provided for a better understanding of the present invention and its advantages, and are not intended to limit the invention.

Example 1

(1. Preparation of Slurry)

To 89.0 parts by mass of N-methyl-2-pyrrolidone, 1.0 part by mass of polyvinyl alcohol (Poval B05 produced by Denka Co., Ltd., degree of saponification: 87%) and 10.0 parts by mass of carbon black powder (acetylene black Li-435 produced by Denka Co., Ltd.) were added and stirred with a planetary mixer (HIVIS DISPER MIX Model 3D-5 produced by PRIMIX Corporation) for 120 minutes to prepare a slurry including carbon black. The obtained slurry was put into a bead mill (Mugenflow MGF2-ZA produced by Ashizawa Finetech Co., Ltd.) equipped with zirconia beads (diameter 0.5 mm) and subjected to a dispersion processing. After the dispersion processing, the zirconia beads were removed by filtration to prepare a slurry.

The volume-based frequency distribution and cumulative distribution of particle size of the carbon black in the slurry thus obtained were measured according to the method described above using a laser diffraction/scattering type particle size distribution measuring device (Microtrac MT3300EXII produced by MicrotracBEL Corp.). In this Example, provided that the volume concentration of carbon black with a particle size of 0.6 μm or more is x (%), the volume concentration of carbon black with a particle size of 0.3 μm or more and less than 0.6 μm is y (%), and the volume concentration of carbon black having a particle size of less than 0.3 μm is 100−(x+y) (%), the result was x=40.5%, y=44.1%, and 100−(x+y)=15.4%.

(2. Preparation of Positive Electrode Paste)

With respect to 1.0 part by mass of the carbon black in the slurry obtained above, 2.0 parts in solute mass of polyvinylidene fluoride in N-methyl-2-pyrrolidone solution as a binder, and 97 parts by mass of lithium nickel cobalt manganese composite oxide $LiNi_{0.5}Mn_{0.3}Co_{0.2}O_2$ (produced by Jiangxi Jiangte Lithium Battery Materials Co., Ltd, "S532") as a positive electrode active material were added and mixed. Further, in order to improve the coatability, N-Methyl-2-pyrrolidone was added as a dispersion medium and mixed to prepare a positive electrode paste such that in the viscosity curve measured with a rheometer (MCR300 produced by Anton Pearl Co., Ltd.), the viscosity at a shear rate of 1 $sec^{-1}$ was 10000 mPa·sec or less.

(3. Preparation of Positive Electrode)

The positive electrode paste was applied onto an aluminum foil having a thickness of 20 μm using a baker-type applicator, followed by drying pressing and cutting to prepare a positive electrode.

(4. Preparation of Negative Electrode)

A negative electrode paste (96.0% by mass of graphite ("AGP-2A" produced by Shenzhen BTR Co., Ltd.), 1.0% by mass of carbon black ("Li-400" produced by Denka Co., Ltd.), 1.0% by mass of sodium carboxymethyl cellulose, and 2.0% by mass of styrene-butadiene copolymer) was applied onto a copper foil having a thickness of 10 μm using a baker-type applicator, followed by drying, pressing and cutting to prepare a negative electrode.

(5. Preparation of Secondary Battery)

As shown in FIG. 1, an aluminum tab 5 was connected to the above-described positive electrode 1, a nickel tab 6 was connected to the above-described negative electrode 2, and the above-described positive electrode 1, a polyolefin microporous film (separator) 3, and the above-described negative electrode 2 were overlapped together and laminated. Then, the exterior (aluminum laminated film) 4 was packed and pre-sealed, and then electrolytic solution was injected, and battery formatting and vacuum sealing were performed to prepare a laminate type secondary battery.

(6. Measurement of Internal Resistance)

Using the prepared secondary battery, the voltage when a current of 0.2, 0.4, 0.6, 0.8, and 1.0 mA was applied at 25° C. for 10 seconds was measured. At this time, the SOC (State Of Charge) was set to 50%. The battery internal resistance R was calculated from R=V/I, and the average value of R was obtained. The internal resistance of the battery in Example 1 was 1.45Ω.

(7. Output Properties (Capacity Retention Rate at 3 C Discharge))

The prepared secondary battery was charged at a constant current and constant voltage of 4.2 V with the limitation of 0.2 C at 25° C., and then discharged to 2.75 V at a constant current with 0.2 C. Next, the discharge current was changed to 0.2 C and 3 C, and the discharge capacity for each discharge current was measured. Then, the capacity retention rate at the time of 3 C discharge with respect to the time of 0.2 C discharge was calculated. The capacity retention rate at the time of 3 C discharge of this Example 1 was 82.4%.

Example 2

A slurry, an electrode paste, a positive electrode, and a secondary battery were prepared in the same manner as in Example 1 except that the dispersion processing time and peripheral speed of the bead mill in Example 1 were changed, and each evaluation was carried out. The results are shown in Table 1.

Example 3

A slurry, an electrode paste, a positive electrode, and a secondary battery were prepared in the same manner as in Example 1 except that based on Example 1, a slurry including carbon black in which the N-methyl-2-pyrrolidone was changed to 85.5 parts by mass and the carbon black powder was changed to 13.5 parts by mass was used, and each evaluation was carried out. The results are shown in Table 1.

Example 4

A slurry, an electrode paste, a positive electrode, and a secondary battery were prepared in the same manner as in Example 1 except that based on Example 1, a slurry including carbon black in which the N-methyl-2-pyrrolidone was changed to 83.5 parts by mass, the polyvinyl alcohol was changed to 1.5 parts by mass and the carbon black powder was changed to 15.0 parts by mass was used, and each evaluation was carried out. The results are shown in Table 1.

Example 5

A slurry, an electrode paste, a positive electrode, and a secondary battery were prepared in the same manner as in Example 1 except that based on Example 1, a slurry including carbon black in which the N-methyl-2-pyrrolidone was changed to 80.2 parts by mass, the polyvinyl alcohol was changed to 1.8 parts by mass and the carbon black powder was changed to 18.0 parts by mass was used, and each evaluation was carried out. The results are shown in Table 1.

Example 6

A slurry, an electrode paste, a positive electrode, and a secondary battery were prepared in the same manner as in Example 1 except that based on Example 1, a slurry including carbon black in which the N-methyl-2-pyrrolidone was changed to 78.0 parts by mass, the polyvinyl alcohol was changed to 2.0 parts by mass and the carbon black powder was changed to 20.0 parts by mass was used, and each evaluation was carried out. The results are shown in Table 1.

Example 7

A slurry, an electrode paste, a positive electrode, and a secondary battery were prepared in the same manner as in Example 2 except that the dispersion processing time and peripheral speed of the bead mill were changed, and each evaluation was carried out. The results are shown in Table 1.

Example 8

A slurry, an electrode paste, a positive electrode, and a secondary battery were prepared in the same manner as in Example 1 except that based on Example 1, a slurry including carbon black in which the N-methyl-2-pyrrolidone was changed to 72.5 parts by mass, the polyvinyl alcohol was changed to 2.5 parts by mass and the carbon black powder was changed to 25.0 parts by mass was used, and each evaluation was carried out. The results are shown in Table 1.

Example 9

A slurry, an electrode paste, a positive electrode, and a secondary battery were prepared in the same manner as in Example 1 except that a slurry including carbon black was prepared by loading 95.0 parts by mass of N-methyl-2-pyrrolidone and 5.0 parts by mass of carbon black powder (Acetylene Black Li-435 produced by Denka Co., Ltd.) into a 50 ml vial, and stirring for 60 minutes with an ultrasonic cleaner (ASU-6 produced by AS ONE Corporation). Each evaluation was then carried out. The results are shown in Table 1.

Comparative Example 1

A slurry, an electrode paste, a positive electrode, and a secondary battery were prepared in the same manner as in Example 3 except that the dispersion processing time and peripheral speed of the bead mill were changed, and each evaluation was carried out. The results are shown in Table 1.

Comparative Example 2

A slurry, an electrode paste, a positive electrode, and a secondary battery were prepared in the same manner as in Example 4 except that the dispersion processing time and peripheral speed of the bead mill were changed, and each evaluation was carried out. The results are shown in Table 1.

Comparative Example 3

A slurry, an electrode paste, a positive electrode, and a secondary battery were prepared in the same manner as in Comparative Example 1 except that the dispersion processing time and peripheral speed of the bead mill were changed, and each evaluation was carried out. The results are shown in Table 1.

Comparative Example 4

A slurry, an electrode paste, a positive electrode, and a secondary battery were prepared in the same manner as in Example 1 except that based on Example 1, a slurry including carbon black in which the N-methyl-2-pyrrolidone was changed to 94.5 parts by mass, the polyvinyl alcohol was changed to 0.5 parts by mass and the carbon black powder was changed to 5.0 parts by mass was used, and further the dispersion processing time and peripheral speed of the bead mill were changed. Each evaluation was then carried out. The results are shown in Table 1.

Comparative Example 5

A slurry, an electrode paste, a positive electrode, and a secondary battery were prepared in the same manner as in Example 8 except that the dispersion processing time and peripheral speed of the bead mill were changed, and each evaluation was carried out. The results are shown in Table 1.

Comparative Example 6

A slurry, an electrode paste, a positive electrode, and a secondary battery were prepared in the same manner as in Example 1 except that based on Example 1, a slurry including carbon black in which the N-methyl-2-pyrrolidone was changed to 69.2 parts by mass, the polyvinyl alcohol was changed to 2.8 parts by mass and the carbon black powder was changed to 28.0 parts by mass was used, and each evaluation was carried out. The results are shown in Table 1.

Comparative Example 7

A slurry, an electrode paste, a positive electrode, and a secondary battery were prepared in the same manner as in Comparative Example 1 except that based on Comparative Example 1, a slurry comprising carbon black in which the N-methyl-2-pyrrolidone was changed to 95.6 parts by mass, the polyvinyl alcohol was changed to 0.4 parts by mass and the carbon black powder was changed to 4.0 parts by mass was used, and each evaluation was carried out. The results are shown in Table 1.

TABLE 1

| | Carbon black concentration | Volume concentration of carbon black (%) | | | D50 | D90 | Battery internal resistance | Output properties |
| --- | --- | --- | --- | --- | --- | --- | --- | --- |
| Test number | (% by mass) in the slurry | 0.6 μm or more | 0.3 μm or more and less than 0.6 μm | Less than 0.3 μm | μm | μm | Ω | % |
| Example 1 | 10 | 40.5 | 44.1 | 15.4 | 0.51 | 2.27 | 1.45 | 82.4 |
| Example 2 | 10 | 31.5 | 48.0 | 20.5 | 0.44 | 1.44 | 1.51 | 81.9 |
| Example 3 | 13.5 | 45.1 | 39.8 | 15.1 | 0.57 | 2.78 | 1.58 | 79.1 |
| Example 4 | 15 | 43.1 | 40.1 | 16.8 | 0.53 | 2.43 | 1.78 | 78.1 |
| Example 5 | 18 | 38.3 | 42.6 | 19.1 | 0.51 | 1.93 | 1.71 | 77.5 |
| Example 6 | 20 | 13.4 | 81.0 | 5.6 | 0.62 | 1.55 | 1.73 | 76.9 |
| Example 7 | 10 | 10.9 | 60.0 | 29.1 | 0.41 | 1.33 | 1.75 | 76.0 |
| Example 8 | 25 | 52.3 | 33.7 | 14.0 | 0.75 | 11.7 | 1.80 | 75.5 |
| Example 9 | 5 | 61.2 | 31.6 | 7.2 | 0.78 | 15.8 | 1.80 | 75.2 |
| Comparative Example 1 | 13.5 | 9.5 | 61.4 | 29.1 | 0.35 | 1.23 | 1.98 | 72.1 |
| Comparative Example 2 | 15 | 55.8 | 28.2 | 16.0 | 0.76 | 10.2 | 2.01 | 70.9 |
| Comparative Example 3 | 13.5 | 27.3 | 38.3 | 34.4 | 0.42 | 1.35 | 2.19 | 69.1 |
| Comparative Example 4 | 5 | 13.5 | 28.7 | 57.8 | 0.40 | 1.21 | 2.81 | 56.1 |
| Comparative Example 5 | 25 | 70.5 | 22.0 | 7.5 | 0.90 | 21.3 | 3.05 | 54.2 |
| Comparative Example 6 | 28 | 72.0 | 26.5 | 1.5 | 0.92 | 23.1 | 3.11 | 52.0 |
| Comparative Example 7 | 4 | 12.0 | 29.8 | 58.2 | 0.39 | 1.18 | 3.31 | 48.9 |

DESCRIPTION OF REFERENCE NUMERALS

1 Non-aqueous secondary battery positive electrode
2 Non-aqueous secondary battery negative electrode
3 Insulation layer (microporous polyolefin film)
4 Exterior
5 Aluminum tab
6 Nickel tab

The invention claimed is:

1. A slurry comprising at least a carbon black and a dispersion medium,
wherein a concentration of the carbon black in the slurry is 5% by mass or more and 25% by mass or less, and
wherein in a volume-based frequency distribution of particle size of the carbon black measured by a laser diffraction/scattering method, provided that a volume concentration of carbon black with a particle size of 0.6 μm or more is x (%), a volume concentration of carbon black with a particle size of 0.3 μm or more and less than 0.6 μm is y (%), and a volume concentration of carbon black having a particle size of less than 0.3 μm is 100−(x+y) (%), the slurry satisfies 10≤x≤70, 30≤y≤90, and 0≤100−(x+y)≤30.

2. The slurry according to claim 1, wherein a cumulative 50% particle size (D50) in the volume-based cumulative distribution of particle size of the carbon black measured by the laser diffraction/scattering method is 0.40 to 0.85 μm.

3. The slurry according to claim 1, wherein a cumulative 90% particle size (D90) in the volume-based cumulative distribution of particle size of the carbon black measured by the laser diffraction/scattering method is 1.0 to 30.0 μm.

4. The slurry according to claim 1, comprising N-methyl-2-pyrrolidone as a dispersion medium.

5. The slurry according to claim 1, comprising a dispersant.

6. The slurry according to claim 5, wherein a content of the dispersant in the slurry is 5 parts by mass or more and 20 parts by mass or less with respect to 100 parts by mass of the carbon black.

7. The slurry according to claim 5, comprising a nonionic dispersant as the dispersant.

8. The slurry according to claim 5, comprising polyvinyl alcohol as the dispersant.

9. The slurry according to claim 8, wherein a degree of saponification of the polyvinyl alcohol is 86 to 97 mol %.

10. The slurry according to claim 1, satisfying 30≤x≤60, 30≤y≤60, and 10≤100−(x+y)≤30.

11. An electrode paste, comprising the slurry according to claim 1, an electrode active material, and a binder.

12. A method for producing an electrode, comprising applying the electrode paste according to claim 11 to a current collector.

13. A method for producing a secondary battery comprising a positive electrode, a negative electrode, and an electrolyte, the method comprising producing one or both of the positive electrode and the negative electrode by carrying out the method for producing an electrode according to claim 12.

* * * * *